United States Patent

Ahn

[11] Patent Number: 5,900,626
[45] Date of Patent: May 4, 1999

[54] NON-CONTACT TYPE MODE SENSING DEVICE FOR USE IN AN ELECTRIC APPLIANCE

[75] Inventor: Seong-Ick Ahn, Seoul, Rep. of Korea

[73] Assignee: Daewoo Electronics Co., Ltd., Rep. of Korea

[21] Appl. No.: 08/837,763

[22] Filed: Apr. 22, 1997

[30] Foreign Application Priority Data

Apr. 30, 1998 [KR] Rep. of Korea ............. 96-13739

[51] Int. Cl.⁶ .................................................. G01D 5/34
[52] U.S. Cl. ................................ 250/231.13; 250/231.18
[58] Field of Search ............................ 250/229, 231.13, 250/231.14, 231.15, 231.16, 231.17, 231.18, 237 G, 237 R

[56] References Cited

U.S. PATENT DOCUMENTS

| | | | |
|---|---|---|---|
| 4,190,767 | 2/1980 | Crouse | 250/231.13 |
| 4,567,467 | 1/1986 | Wiblin et al. | 250/231.18 |
| 4,650,995 | 3/1987 | Tokunaga et al. | 250/231.13 |
| 4,988,865 | 1/1991 | Schmidt et al. | 250/231.18 |
| 5,061,848 | 10/1991 | Choi . | |
| 5,171,982 | 12/1992 | Kronenberg . | |
| 5,220,161 | 6/1993 | Geis et al. . | |
| 5,555,776 | 9/1996 | Gazza | 250/231.13 |
| 5,557,101 | 9/1996 | Choi | 250/231.13 |
| 5,748,181 | 5/1998 | Fu et al. | 250/231.18 |

FOREIGN PATENT DOCUMENTS 2157039 10/1985 United Kingdom .
2234345 1/1991 United Kingdom .

*Primary Examiner*—Edward P. Westin
*Assistant Examiner*—John R. Lee
*Attorney, Agent, or Firm*—Pennie & Edmonds LLP

[57] ABSTRACT

There is disclosed a non-contact type mode sensing device for use in an electric appliance. The mode sensing device comprises a stationary body, a driven gear rotatably fixed on the pin of the stationary body, and an optical coupler having a light emitter and a light receiver. The driven gear is provided with a circular reflective track formed on the bottom surface thereof. A plurality of reflective portions are formed, along a circular track, on a bottom surface of the driven gear. The reflective portions have different arcuate lengths from one another. The light beam emitted by the emitter of the optical coupler is reflected by the reflective portions and received at the receiver during the rotation of the driven gear, thereby allowing the optical coupler to produce signals in response to the presence or absence of the light reflected by the reflective portions.

6 Claims, 4 Drawing Sheets

NON-CONTACT TYPE MODE SENSING DEVICE FOR USE IN AN ELECTRIC APPLIANCE

FIELD OF THE INVENTION

The present invention relates to a non-contact type mode sensing device for use in an electric appliance; and, more particularly, to a non-contact type mode sensing device with a simplified structure.

DESCRIPTION OF THE PRIOR ART

There is shown in FIGS. 1 and 2 a conventional non-contact type mode sensing device disclosed in U.S. Pat. No. 5,061,848. The conventional non-contact type mode sensing device includes a stationary body 3 provided with a pin 3' and a set of optical couplers 9 (9a, 9b and 9c). A driven gear 1 is rotatably fixed on the pin 3' and rotated by a driving gear (not shown). A plurality of reflector pieces 8 (8a, 8b and 8c) are arranged, along a plurality of concentric circular tracks, on the bottom surface of the driven gear 1. The number of the optical couplers 9 equals to that of the tracks of the reflector pieces 8. The light emitted from an emitter of each optical coupler 9a, 9b and 9c is reflected by the reflector pieces 8 and received by a receiver of the corresponding optical coupler 9.

When the driven gear 1 is rotated, the reflector pieces 8 of a predetermined pattern formed on the bottom surface of the driven gear 1 are rotated, and each of the optical couplers 9 detects the presence or absence of reflected light from the reflector pieces 8. Each of the optical couplers 9 produces an electric signal in response to the presence or absence of reflected light and transmits it to a microprocessor (not shown). The microprocessor determines the present operation mode depending on the signals from the optical couplers 9.

However, in such a conventional mode sensing device, since a large number of reflector pieces are required, it is difficult to form the reflector pieces in an accurate pattern along the concentric circular tracks and, therefore, it is apt to malfunction.

SUMMARY OF THE INVENTION

It is, therefore, a primary object of the invention to provide a simplified non-contact type of mode sensing device having a reduced number of reflector pieces.

In accordance with an aspect of the present invention, there is provided a non-contact type mode sensing device for use in an electric appliance, the mode sensing device comprising: a stationary body; a driven gear rotatably fixed on the stationary body, the driven gear being provided with a plurality of reflective portions formed, along a circular track, on a bottom surface thereof, the reflective portions having different arcuate lengths from one another; and an optical coupler having a light emitter and a light receiver, the optical coupler being fixed on the stationary body in such a way that a light beam emitted by the light emitter of the optical coupler is reflected by the reflective portions and received by the receiver while the driven gear rotates.

In accordance with another aspect of the present invention, there is provided a non-contact type mode sensing device for use in an electric appliance, the mode sensing device comprising: a stationary body; a driven gear rotatably fixed on the stationary body, the driven gear being provided with a plurality of protruding portions disposed, along a circular track, on a bottom surface thereof, the protruding portions being spaced apart at different distances from each other; and an optical coupler having a light emitter and a light receiver, the optical coupler being fixed on the stationary body, wherein the protruding portions, passing between the emitter and the receiver of the optical coupler, prevent a light beam emitted by the emitter from being transmitted to the receiver while the driven gear rotates.

In accordance with further another aspect of the present invention, there is provided a non-contact type mode sensing device for use in an electric appliance, the mode sensing device comprising: a stationary body; a driven gear rotatably fixed on the stationary body, the driven gear being provided with a plurality of protruding portions disposed, along a circular track, on a bottom surface thereof, the protruding portions having different arcuate lengths from one another; and an optical coupler having a light emitter and a light receiver, the optical coupler being fixed on the stationary body, wherein the protruding portions, passing between the emitter and the receiver of the optical coupler, prevent a light beam emitted by the emitter from being transmitted to the receiver while the driven gear rotates.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE PREFERRED EMBODIMENT

Figure 1:
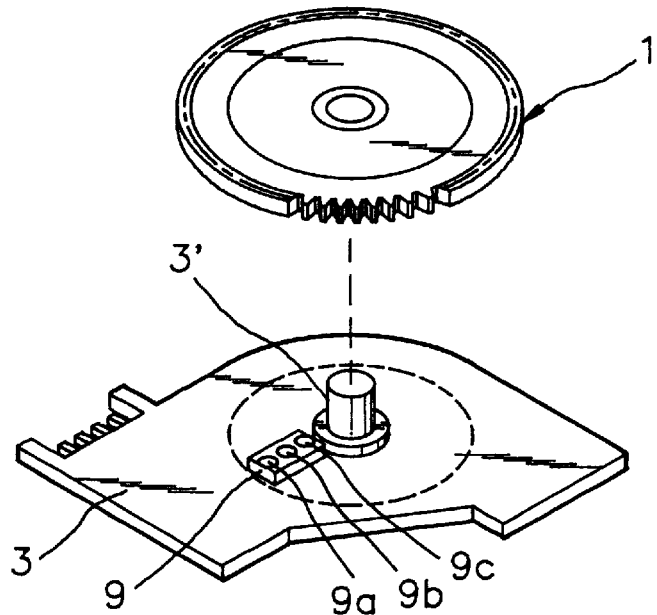
FIG. 1 shows a perspective view of a conventional non-contact type mode sensing device.
Figure 2:
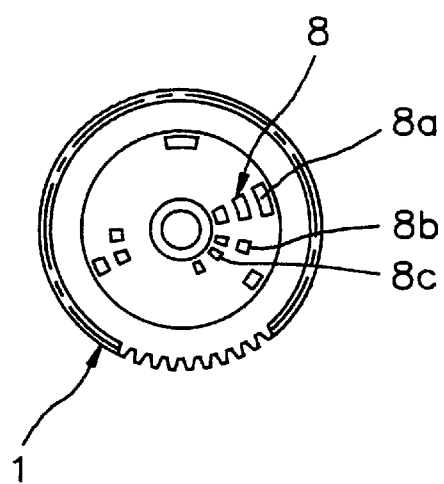
FIG. 2 illustrates a bottom view of the driven gear in FIG. 1.
Figure 3:
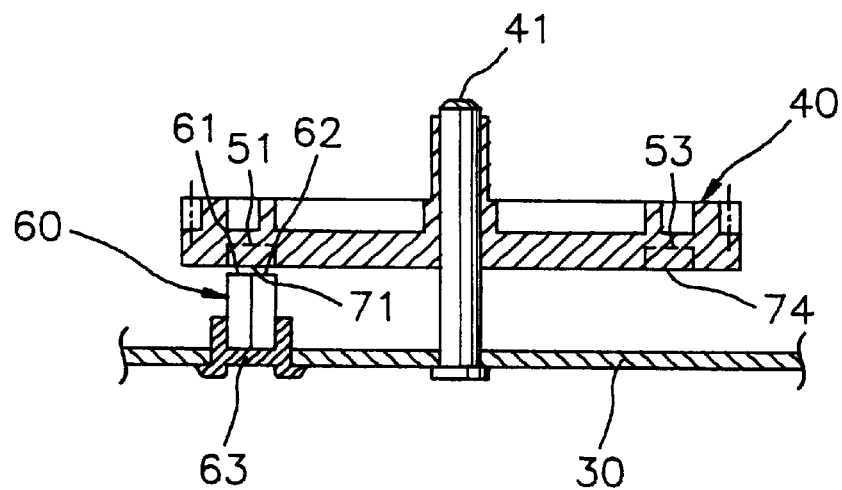
FIG. 3 sets forth a cross-sectional view of a non-contact type mode sensing device in accordance with a preferred embodiment of the present invention.
Figure 4:
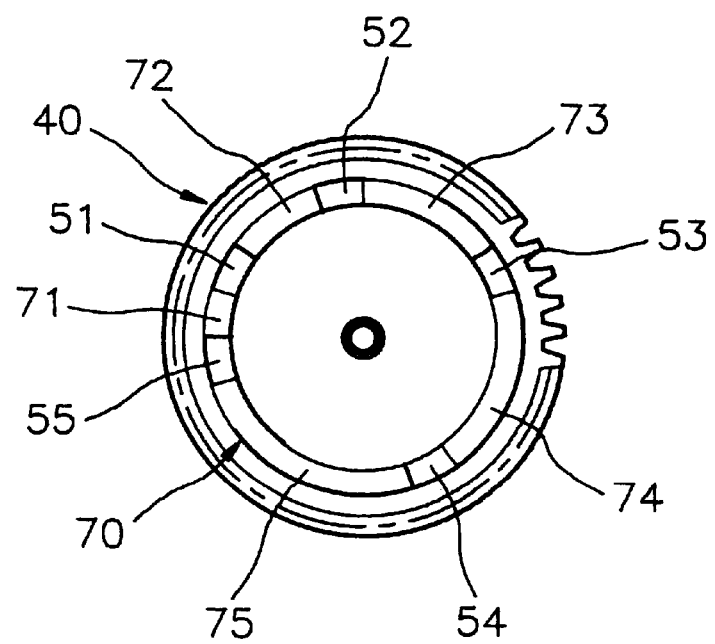
FIG. 4 presents a bottom view of the driven gear in FIG. 3, showing the circular reflective track formed on the bottom surface thereof.

Referring to FIGS. 3 and 4, a non-contact type mode sensing device, employed in a video cassette recorder ("VCR"), in accordance with a preferred embodiment of the present invention includes a stationary body 30, an optical coupler 60, and a driven gear 40.

The driven gear 40, rotatably fixed on the stationary body 30 through a shaft 41, is engaged with a driving gear (not shown) and rotated in response to the rotation thereof. A plurality of reflective portions 71 to 75 are formed, along a circular track 70, on the bottom surface of the driven gear 40. The reflective portions 71 to 75 have different arcuate lengths from one another. A plurality of non-reflective portions, or recesses 51 to 55 are formed between the adjacent reflective portions on the bottom surface of the driven gear 40.

The optical coupler 60, provided with an light emitter and a light receiver, is fixed on the stationary body 30 through a holder 63 in such a way that the light emitted from the light emitter of the optical coupler 60 is reflected by the reflective portions 71 to 75 and received at the light receiver during the rotation of the driven gear 40.

When the operation mode of the VCR is changed, the driven gear 40 is rotated by a certain angle and light from the light emitter 61 of the optical coupler 60 is reflected by the reflective portions 71 to 75 passing above the optical coupler 60 and is received by the receiver 62. Depending on the presence time of light reflected, a microprocessor (not shown) determines the present operation mode of the VCR and controls the other electric components such as a capstan motor (not shown) according to the determined mode.

Figure 5:
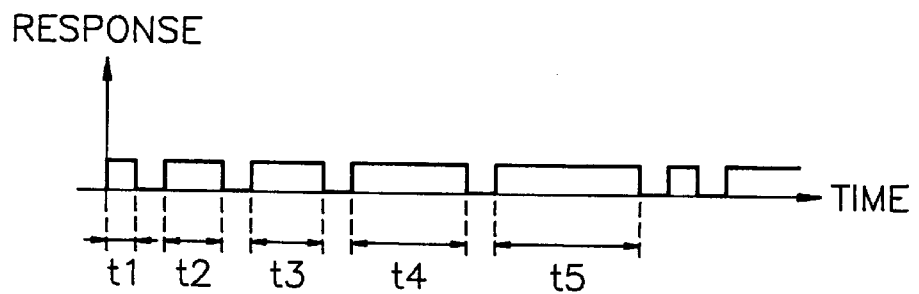
FIG. 5 depicts a diagram of the signals produced by the mode sensing device of the present invention.

Operation of the mode sensing device of the present invention will now be described with reference to FIGS. 3 to 5.

First, at a stop mode, the first recess 51 is positioned immediately above the optical coupler 60. For example, when an operator pushes a play button of the VCR, the driven gear 40 is rotated until, e.g., the second recess 52 is positioned immediately above the optical coupler 60. While the driven gear 40 is rotated, the light beam from the light emitter 61 of the optical coupler 60 is reflected by the first reflective portion 71 and is received by the light receiver 62, and the microprocessor checks the presence time t1 of light reflected to determine that the VCR is currently in a play mode. Subsequently, if the operator pushes a fast forward button, the driven gear 40 are rotated until, e.g., the third recess 53 is positioned immediately above the optical coupler 60. While the driven gear 40 rotates, the light beam from the light emitter 61 of the optical coupler 60 is reflected by the second reflective portion 72 and is received by the receiver 62. The microprocessor checks the presence time t2 of light reflected by the third reflective portion 73 to determine that the VCR is currently in a fast forward mode. It is appreciated to those skilled in the art that the microprocessor can also determine the other modes using the same principle.

On the other hand, in case that the mode is changed from the stop to the fast forward, the driven gear 40 is rotated clockwise from the stop mode until the third recess 53 is positioned immediately above the optical coupler 60. While the driven gear 40 rotates, the light beam from the light emitter 61 of the optical coupler 60 is, in turn, reflected by the first and the second reflective portions 72, 73. The microprocessor checks the total presence time t1+t2 of light reflected and determines that the VCR is in the fast forward mode.

Figure 6:
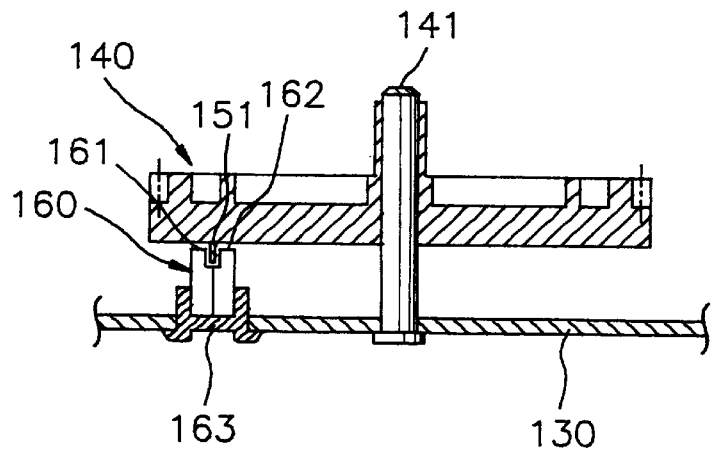
FIG. 6 sets forth a cross-sectional view of a non-contact type mode sensing device in accordance with another preferred embodiment of the present invention.
Figure 7:
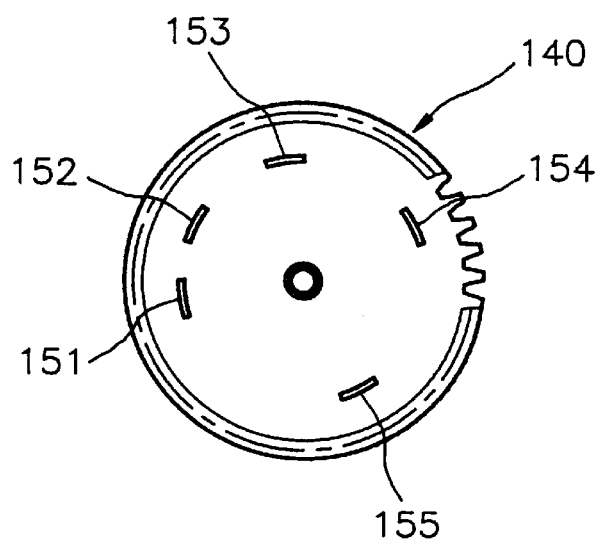
FIG. 7 presents a bottom view of the driven gear in FIG. 6, showing the protruding portions disposed, along a circular track, on the bottom surface of the driven gear.

There is shown in FIGS. 6 and 7 a non-contact mode sensing device in accordance with another preferred embodiment of the present invention. The mode sensing device of the second preferred embodiment includes a stationary body 130, a driven gear 140, and an optical coupler 160.

The driven gear 140, rotatably fixed on the stationary body 130 through a shaft 141, is engaged with a driving gear (not shown) and rotated in response to the rotation thereof. A plurality of, e.g., five protruding portions 151 to 155 are disposed, along a circular track, on the bottom surface of the driven gear 140. The protruding portions 151 to 155 are spaced apart at different distances from one another and have substantially the same length.

The optical coupler 160, provided with an light emitter 161 and a light receiver 162, is fixed on the stationary body 130 through a holder 163. While the driven gear rotates, the protruding portions 151 to 155, passing between the light emitter 161 and the light receiver 162 of the optical coupler 160, prevents the light emitted from the light emitter 161 from being transmitted to the receiver. Therefore, the signal pulse from the optical coupler 160 is same as that in the first preferred embodiment.

Figure 8:
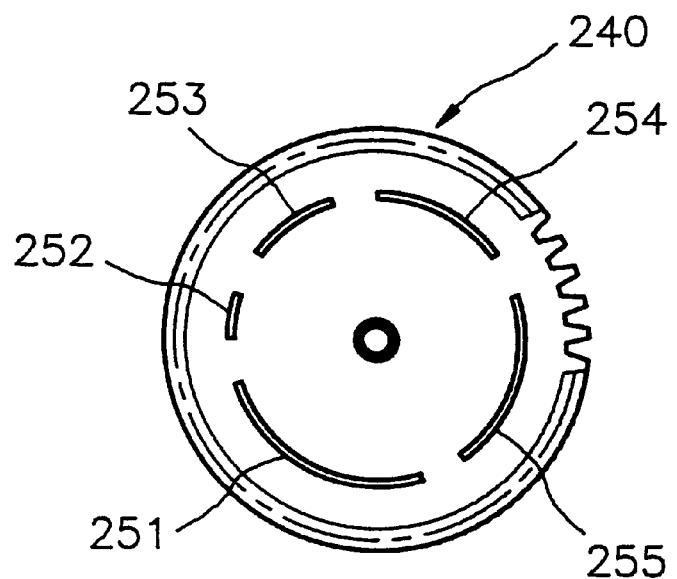
FIG. 8 presents a bottom view of the driven gear of a non-contact type mode sensing device in accordance with another preferred embodiment of the present invention.
Figure 9:
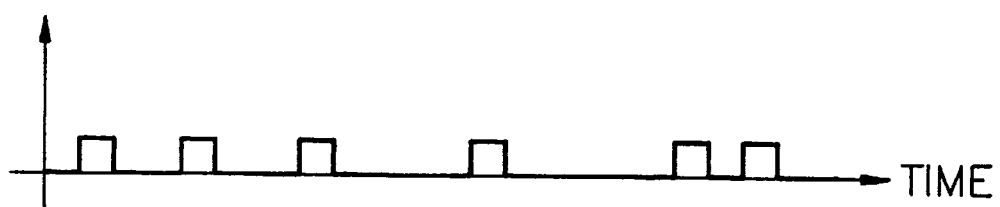
FIG. 9 depicts a diagram of the signals produced by the mode sensing device of FIG. 8.

Furthermore, there is shown in FIG. 8 a non-contact type mode sensing device in accordance with further another preferred embodiment of the present invention. The non-contact type mode sensing device of the third preferred embodiment comprises a driven gear 240 provided with a plurality of protruding portions 251 to 255 disposed on the bottom surface of the driven gear 140. The protruding portions 251 to 255 have different arcuate lengths from one another and are spaced apart by gaps of equal length. In this case, as shown in FIG. 9, the optical coupler 160 produces the signal pulse which are opposite to the signals in FIG. 5, and the microprocessor checks the absence time of light received by the receiver 162 of the optical coupler 160 to determine the present operation mode of the VCR.

Although the invention has been shown and described with respect to the preferred embodiments, it will be understood by those skilled in the art that various changes and modifications may be made without departing from the spirit and scope of the invention as defined in the following claims.

What is claimed is:

1. A non-contact mode sensing device for use in an electric appliance, the mode sensing device comprising:

a stationary body:

a driven gear rotatably fixed on the stationary body, the driven gear being provided with a plurality of reflective portions formed, along a circular track, on a surface thereof facing the stationary body, the reflective portions having different arcuate lengths from one another;

an optical coupler having a light emitter and a light receiver, the optical coupler being fixed on the stationary body in such a way that a light beam emitted by the light emitter of the optical coupler is reflected by the reflective portions and received by the receiver while the driven gear rotates; and a microprocessor configured to determine an operation mode of the electric appliance depending on a length of time during which light from the light emitter is continuously reflected by the reflective portions and received by the light receiver.

2. The device of claim 1, wherein a recess is formed between each adjacent pair of reflective portions on the surface of the driven gear facing the stationary body.

3. A non-contact mode sensing device for use in an electric appliance, the mode sensing device comprising:

a stationary body;

a driven gear rotatably fixed on the stationary body, the driven gear being provided with a plurality of protruding portions disposed, along a circular track, on a surface thereof facing the stationary body, the protruding portions being spaced apart at different distances from one another;

an optical coupler having a light emitter and a light receiver, the optical coupler being fixed on the stationary body, wherein the protruding portions, passing between the emitter and the receiver of the optical coupler, prevent a light beam emitted by the emitter from being transmitted to the receiver while the driven gear rotates; and a microprocessor configured to determine an operation mode of the electric appliance depending on a length of time during which light from the light emitter is continuously received by the light receiver.

4. The non-contact mode sensing device according to claim 3, wherein each of said plurality of protruding portions have substantially the same arcuate length.

5. A non-contact mode sensing device for use in an electric appliance, the mode sensing device comprising:

a stationary body;

a driven gear rotatably fixed on the stationary body, the driven gear being provided with a plurality of protruding portions disposed, along a circular track, on a surface thereof facing the stationary body, the protruding portions having different arcuate lengths from one another;

an optical coupler having a light emitter and a light receiver, the optical coupler being fixed on the stationary body, wherein the protruding portions, passing between the emitter and the receiver of the optical coupler, prevent a light beam emitted by the emitter from being transmitted to the receiver while the driven gear rotates; and a microprocessor configured to determine an operation mode of the electric appliance depending on a length of time during which light from the light transmitter is continuously absent at the light receiver.

6. The non-contact mode sensing device according to claim 5, wherein adjacent ones of said protruding portions are spaced apart by gaps of equal size.

\* \* \* \* \*